United States Patent Office

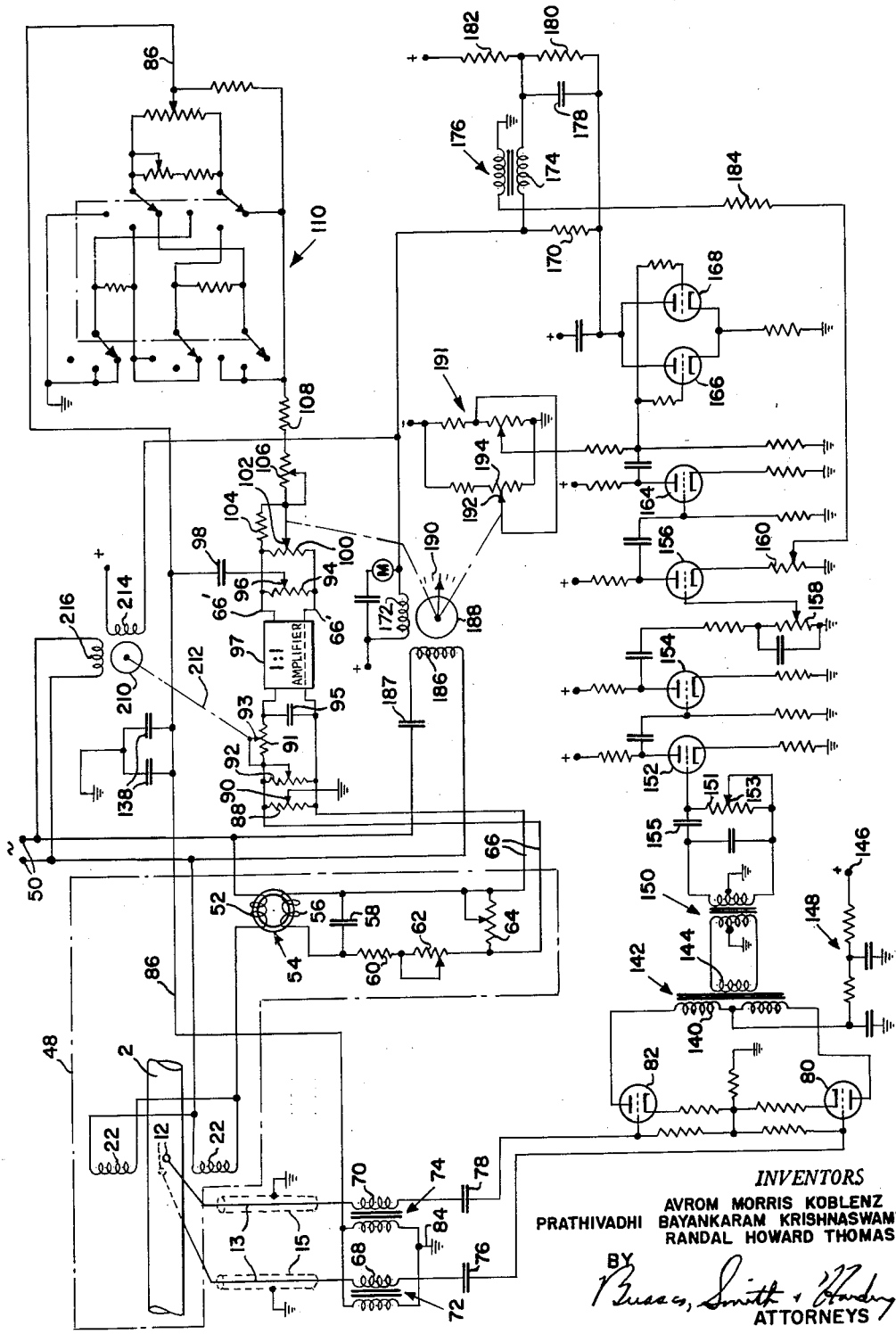

3,039,306
Patented June 19, 1962

3,039,306
MAGNETIC FLOWMETER
Avrom Morris Koblenz, Philadelphia, Prathivadhi Bayankaram Krishnaswamy, Hatboro, and Randal Howard Thomas, Philadelphia, Pa., assignors to Fischer & Porter Company, Hatboro, Pa., a corporation of Pennsylvania
Filed Apr. 14, 1959, Ser. No. 806,290
4 Claims. (Cl. 73—194)

This invention relates to magnetic flowmeters of the type in which a potential induced in a fluid flowing through a magnetic field is utilized as a measure of quantity of flow.

As is well known, the current or potential outputs produced in a flowmeter of the magnetic type are very small for ordinary flows to be measured and strong magnetic fields are required with consequent difficulties in elimination of the disturbing effects of "noise." Problems of the types encountered have been attacked in various ways, and a highly effective solution has been found by utilizing constructions and circuitry as disclosed in the prior applications of Sholom Kass, Serial Nos. 768,595 and 768,762 and of Victor P. Head, Serial Nos. 768,596, now Patent No. 3,005,342, and 768,701, all filed October 21, 1958. The arrangements disclosed in these applications are the same, but various different aspects are claimed therein.

Magnetic flowmeters provided in accordance with said applications have been found highly satisfactory so long as the conductivity of the fluid undergoing measurement is above about 20 micromhos per centimeter. With fluids having less conductivity measurement errors result due to phase shifts originating from distributed capacity and it is the general object of the present invention to extend the range of accurate measurement to fluids of conductivities much less than 20 micromhos per centimeter. In accordance with the present invention, fluids may be measured having conductivities as low as 1 to 0.1 micromho per centimeter, depending upon lengths of cables which are used for signal transmission. While heretofore magnetic flowmeters have been practically useful only for liquid flows, the extension of range to very low conductivities renders them also useful for gaseous fluids such as steam. While, as will appear hereafter, the invention is applicable to other magnetic flowmeter arrangements than that disclosed in the aforementioned applications, the invention will be particularly described with reference to the circuitry of said applications.

The problem which arises in the case of measurement of high resistance fluids may be best appreciated by considering the equivalent circuit of a magnetic flowmeter signal cource. This equivalent circuit is basically that of a source voltage feeding a series circuit consisting of a high resistance and a capacitance, with the output signal taken across the capacitance. The high resistance involved is that presented by the fluid. The capacitance is that presented by the distributed capacity of a connecting cable arrangement together with the effectively parallel capacitances introduced in transformer windings. As will be evident, if the reactance of the effective capacitance is of the order of the high resistance there is not only a substantial phase shift of the derived signal with respect to the voltage to be measured generated between the electrodes, but there is also a variable attenuation of in-phase component of the signal depending upon variations in both the resistance and capacitance. Furthermore, residual quadrature signals not practically removable by shielding give rise, by phase shift, to in-phase components not distinguishable from the signals originating from fluid flow.

If the resistance and capacitance could be considered even approximately constant throughout a range of operation, the solution to the problem might not be so difficult; but, particularly in the case of very high resistance liquids there is involved a very large error due to temperature changes, it being not unusual for the conductivity of a high resistance liquid to vary by as much as a 1 to 5 ratio in the temperature range from 20° C. to 80° C. Furthermore, in most installations it is desirable to have the electrodes connected through cables of substantial lengths to the first elements of the circuit which would serve to terminate, effectively, the shunt capacitance. Cables of desired lengths not only introduce substantial capacitance, and therefore comparatively low reactance in comparison with the effective high series resistance, but the capacitance is also variable with temperature and configuration changes. In accordance with the most desirable type of circuit used, i.e., that of the applications referred to above, the output signal from the electrodes is automatically balanced to provide an error signal which is used to control the automatic rebalancing. This error signal is typically of the order of 1% of the signal produced at the electrodes. However, the quadrature components which are unbalanced and which have their origin in the phase shift above indicated and in stray pickups may be many times larger than the error signal and the attenuation of the in-phase component may also have a magnitude considerably exceeding the error signal. Furthermore original quadrature signals give rise to in-phase components and measurements dependent upon balancing of in-phase signals thus do not truly reflect flow. While the circuit arrangement of said applications is designed to take care of quadrature signals due to stray pickups and phase shifts in other portions of the apparatus, the quadrature signals arising from the high resistivities of liquids are not compensated (and remain present to overload amplifiers), and it is the compensation of the latter to which the present invention is primarily directed.

In brief, in accordance with the invention, the cable conductors connected to the electrodes have introduced thereto through a transformer arrangement rebalancing signals which are opposite in both magnitude and phase to the signals appearing at the cable conductor ends remote from the electrodes. An error signal provides automatic adjustment of a network to accomplish this end, the automatic adjusting means comprising independent motors which are responsive, respectively, to in-phase and quadrature errors, so that nulling is accomplished only when balance of both of these components is achieved. The quadrature signal balancing arrangement is, furthermore, such as to provide a variable attenuation compensating for the attenuation which results from the phase shift of the signals at the ends of the cable conductors with respect to the signals picked up at the electrodes. The operation of the rebalancing system for the in-phase signals thus becomes an accurate measurement of flow.

The attainment of the objectives of the invention may be best made clear by reference to the drawing, the FIGURE of which shows a wiring diagram providing control in accordance with the invention.

The circuit which is illustrated is, to a considerable extent, similar to that of the foregoing applications, and for simplifying comparison reference numerals in the figure are applied to elements corresponding to those used in said applications.

The meter comprises a tube 2 which typically may be of stainless steel provided with an insulated liner. At diametrically opposite points the tube 2 is provided with pickup electrodes 12 insulated from the tube but making conductive contact with the fluid flowing therethrough. A magnetic field of uniform type is provided which extends at right angles to the diameter forming the common axis of the electrodes 12 and to the tube axis, this field being provided by a pair of coils 22 of identical shape. Since the present invention is not concerned directly with the details of what has been so far discussed, these details are not illustrated, but the arrangement of the electrodes of the magnetic field producing means are desirably as shown and described in the applications referred to above.

The flowmeter comprises two units which may be conveniently referred to as primary and secondary units. The primary unit encompasses the elements which are located within the boundary 48, this unit including the tube 2, the electrodes 12 and the coils 22. Those elements which are outside the boundary 48 constitute the secondary unit. As described in said applications, this division of the flowmeter into two units is convenient inasmuch as the secondary unit may be standard for flowmeters of a large range of flow capacity, while the primary units may be made different for the measurement of different flow ranges. All of the primary units are arranged to match the standardized secondary unit to afford interchangeability.

Alternating current is supplied from the terminals 50 connected to the usual power supply, for example, 110 volts at 60 cycles. The wiring diagram also shows various direct current supply terminals and it will be understood that these are fed by conventional direct power supplies energized from the commercial alternating power supply.

The magnetic field windings 22 are connected in parallel and to the supply terminals 50, there being in series with the field windings the primary winding 52 of a toroidal transformer 54 the secondary winding 56 of which is connected to a network comprising the capacitor 58 connected across the secondary and the parallel resistance arrangement comprising in series the fixed and adjustable resistors 60 and 62 and the adjustable resistor 64, to the terminals of the latter there being connected the leads 66 to the secondary unit. The transformer 54 and the network provide the impedance match to the secondary unit. By the use of the network described, the output of the secondary of the toroidal current transformer 54 is adjusted to provide a feedback potential 180° out of phase with the signal potential which appears at the electrodes 12, it being noted that the primary of this current transformer is directly in series with the windings 22 and carries the current in these windings. While the elements of the network are interdependent, the adjustment of resistor 62 primarily affords phase adjustment while that of resistor 64 affords amplitude adjustment. These provide corrections for eddy current shifts of the flow signal with respect to the magnet coil current. The result of the adjustments is to provide a constant ratio between the potential per unit velocity appearing at the electrodes and the current which is provided at the conductors 66. The ultimate result is that the response of the secondary unit is full scale in terms of feet per second of liquid flow velocity for any primary unit which may be associated with a secondary unit, the transformer 54 having a turn ratio consistent with the securing of this result.

Extending from the electrodes 12 are cables providing connections between the units, which cables are primarily responsible for the phase shifts causing troubles. The cables are indicated as comprising insulated conductors 13 surrounded by grounded shields 15. The cables thus provided may be of considerable length depending upon the physical arrangement of the apparatus which is desired. A pair of transformers 72 and 74 of the same construction have their secondaries 68 and 70 connected to the conductors 13 and through equal capacitors 76 and 78 to the grids of triodes 80 and 82 of a preamplifier. The primaries of the transformers are connected in parallel between ground at 84 and a line 86. Polarities of the transformers are so chosen that signals bucking the electrode signals are produced in both lines running from the electrodes. The symmetrical transformer arrangements provide rejection of signals which may flow in the same direction through the symmetrical connections. The ratios of the transformers 72 and 74 are the same and are chosen in dependence upon the other circuit constants.

The feedback signal in connection 86 is derived from a network receiving its input from the lines 66. A potentiometer 88 connected between these lines has its adjustable contact 90 grounded. A second potentiometer 92 is connected between these lines to provide a variable resistance. A potentiometer 91 having its variable contact 93 connected to provide a variable resistance is located in series with one of the lines 66 and in conjunction with a capacitor 95 connected across the lines provides a variable phase shifting and attenuation network which is adjusted by a motor as hereafter described. The signal across the capacitor 95 is delivered to an amplifier 97 having a 1:1 amplification ratio. This amplifier is provided to eliminate loading of the signal across the capacitor 95 while supplying an identical signal to the further portion of the network. If other circuit constants are chosen accordingly, the amplifier may be replaced by one which has a different but definite gain. The output from the amplifier is provided to the lines 66' across which there is connected the potentiometer 94 having an adjustable contact 96 connected through a capacitor 98 to the line 86. The arrangement here is such, the capacitor 98 being of high reactance at the signal frequencies, that there is delivered to the line 86 a quadrature signal. A fourth potentiometer 100 connected between the lines 66' is arranged as illustrated with its variable contact 102 connected to one of the lines through a resistor 104 and through a variable resistor 106 and a fixed resistor 108 to the range adjustment network generally indicated at 110. The arrangement just described is similar to what is shown in the applications referred to above with the exception that there is provided the phase adjusting network 91, 95 and there is interposed the isolating amplifier 97 having a high input impedance to avoid loading of the input portion of the circuit. It may be noted that the lower input and output terminals of the amplifier 97 are desirably directly connected so that the adjustment provided at 90 performs its operation of centering as described below.

The range adjustment network 110 plays no special part in the matter of the present invention and is therefore not described in detail. It may be regarded as merely providing variable attenuation between the resistor 108 and the line 86.

The functions of the various parts of the network just described are as follows:

The potentiometer 88 serves as an electrical centering control to set zero flow at any desired position on the recording chart of the meter. This makes it possible to indicate and measure bidirectional flow where that is required. The nature of this action will be evident upon considering the ground connections of contact 90 and, at 84, the ground connection of the primaries of transformers 72 and 74.

The adjustable resistance at 92 is to set the input resistance of the balancing network. This input resistance is desirably of low value, typically, for example, about 81 ohms, and by the use of the adjustment under discussion the input resistance may be set to such a value that various secondary units may be made interchangeable.

The function of the network 91, 95 has already been indicated, this being for the purpose of introducing variable phase adjustment and attenuation counterbalancing that of the original signal which is due to cable capacitance. The function of the isolating amplifier 97 has been described.

The potentiometer 94 and its connection through capacitor 98 provides for the nulling out of signals arising otherwise than from the distributed and other capacitances presented to the primary unit which are in quadrature with the error signal. The proper phase of quadrature signal is obtained by use of the capacitor 98 the reactance of which is many times that of the total network. A phase shift obtained from this capacitor is very nearly 90° and the shift gives essentially a true quadrature signal.

Balancing of in-phase signals is effected by the motor controlled movements of the contact 102 of potentiometer 100 which is associated with the fixed resistor 104 which latter compensates for the load on the potentiometer 100 caused by the resistors 106, 108 and the range adjustment network, and with the adjustable resistance 106 which compensates for the loading on the range network by the input impedance of the balanced transformers 72 and 74.

The balancing signal from the last mentioned elements is fed and attenuated through the range adjusting network 110 so that full scale sensitivity is accurately known.

The inductive reactance of the balancing transformers causes a phase shift of the balancing signal which must be corrected, and while automatic correction is obtained as later described, there may be desirably used for an original balancing adjustment capacitors 138 connected between line 86 and ground chosen to suit particular units. Through the use of standard capacitors, one being relatively large and the other being small to act as a trimmer, it is unnecessary to provide for this particular phase correction an adjustable capacitor.

If it were assumed that there was an indicator of the potential difference between the grids of triodes 80 and 82, and if adjustment of the contact 102 of potentiometer 100 was made to provide a zero in-phase potential difference at these grids, it will be evident that the setting of the potentiometer contact would be a measure of the liquid flow.

The foregoing would be true if there was no attenuation of in-phase signal due to shunting capacitance of the leads 13. Automatic adjustment to secure a null is achieved as will now be described.

The triodes 80 and 82 and their associated circuitry provide a preamplifier for the net output from the secondaries of transformers 72 and 74 and the electrodes 12.

The preamplifier provides primarily an impedance matching device and transformation from a balance-to-unbalance arrangement and provides longitudinal signal rejection. The triodes are connected in push-pull arrangement to the primary windings 140 of a transformer 142, the secondary 144 of which feeds through a transformer 150 amplified signals to the first stage triode 152 of the main amplifier. Desirably special filtering is provided at 148 for the positive supply provided to the triodes 80 and 82 from a positive supply terminal 146 of the power supply. The main amplifier involves the triodes 152, 154, 156 and 164 in generally conventional form with phase shift adjustment by variation of contact 153 of potentiometer 151, providing a variable resistance associated with capacitor 155, and with gain control provided at potentiometer 158. In order to void hum it is desirable to provide to the heaters of triodes 80, 82, 152 and 154 suitable direct current which may be derived from the supply through a suitable rectifier and simple filter system, not shown. Rate feedback control is provided at the potentiometer 160 in the cathode-to-ground return of triode 156.

In order to provide sufficient motor driving power, a pair of triodes 166 and 168 provide a power amplifier by arrangement in parallel. Their output is provided through resistor 170 to the field winding 172 of the motor 188. The other phase winding 186 of this motor is provided with reference current from the terminals 50 through the capacitor 187. It will be understood that the motor is of a type which reverses in accordance with the phase relationship of the currents through its windings 172 and 186, remaining stationary when the current in winding 172 is in quadrature with that properly produced therein by desired signals picked up by electrodes 12. Shunted across the field winding 172 is the series arrangement of an alternating current voltmeter 173 and a capacitor 175. The purpose of this arrangement is described in the applications referred to above.

The primary 174 of a transformer 176 is connected between the signal output side of the resistor 170 and the parallel arrangement of resistor 180 and capacitor 178, the right hand end of the transformer primary 174 being connected through resistor 182 to a positive supply terminal which may be the same terminal as that to which the winding 172 is connected. The secondary of the transformer 176 provides a signal between ground and the adjustable contact of the rate adjustment potentiometer 160, the connection being through resistor 184 and lead 162. This rate feedback control has its usual functions.

The circuit arrangement illustrated at 191 is provided to prevent rapid excursions of a recording pen in response to hydraulic "noise" as described in detail in the application of Sholom Kass, Serial No. 768,762, referred to above. Included is a potentiometer 194 having a contact 192 adjusted by motor 188.

While 188 has been generally referred to as a motor, it will be understood that this will generally be a conventional phase-sensitive recorder motor driving through reduction gearing the potentiometer contacts 102 and 192 and either an indicator or a marking pen cooperating with either a fixed or time driven chart scale indicated at 190. In conventional fashion this may also (or solely) operate controls related to the flow, e.g., to maintain the flow constant, to effect other operations in accordance with the flow, or the like.

A reversible motor 210 is connected to drive through a mechanical connection indicated at 212 the adjustable contact 93 of the potentiometer 91 which provides the variable resistance of the phase and attenuation adjusting network 91, 95. One of the phase windings of this motor is indicated at 214 and receives its power input from the same connections as feed the phase winding 172 of motor 188. The other phase winding 216 of the motor 210 is connected directly to the supply terminals 50. It will be noted that the respective windings 186 and 216 receive currents 90° out of phase. In brief, the motor 188 operates in response to error signals which are in phase with the output from the electrodes 12, while the motor 210 operates in response to signals which are in quadrature with those produced at the electrodes 12.

The overall operation of the flowmeter may now be outlined as follows:

For a given rate of flow through the tube 2 there will be produced an output voltage across the electrodes 12 the magnitude of which is proportional to the flow rate for a given magnetic field strength provided by the windings 22. Considering, first, the in-phase component of this signal appearing at the transformer ends of the lines 13 prior to balance corresponding signals are applied to the amplifier system to provide to the motor winding 172 a current which will drive the motor 188 and with it the potentiometer contact 102 to provide a feedback signal to balance the electrode signal to provide a zero in-phase input to the amplifier. Note that in case of voltage change at terminals 50 affecting the strength of the magnetic field, a corresponding change in output from the transformer 54 occurs so as to balance out effectively such variations.

Concurrently, a similar situation arises in the matter of nulling quadrature signals, the motor 210 being operated by quadrature signal components appearing in winding 214 to adjust phase in the network 91, 95 in a direction to balance out the quadrature signal components, simultaneously compensating for attenuation which is dependent upon phase shift.

The two foregoing corrective operations occur simultaneously, and a final condition is achieved in which the transformers 72 and 74 provide balancing outputs 180° out of phase with the signals which appear at the ends of the cable conductors 13 remote from the electrodes. The balancing outputs are also equal in magnitude to the signals arising from the electrodes. In view of the simultaneous automatic adjustment to compensate for attenuation the adjustment of the motor 188 as reflected by the position of an indicator or recorder pen on a dial or chart 190 constitutes a measure of the flow in the pipe 2.

As a result of the foregoing, the operational range of the flowmeter is extended to fluids having low conductivities of the order of 0.1 to 1.0 micromho per centimeter. Furthermore, since a null balance detecting or recording scheme is used the results are independent of the magnitude of the conductivity as this may vary with temperature (or in the case of elastic fluids with pressure), since the resistance involved has significance only when capacitance is involved giving rise to phase shift.

It will be apparent that the feedback described herein might be provided in conjunction with other arrangements for detection and measure of signals, the objective being, in any case the elimination of effects of distributed capacitance and/or of lumped capacitance such as may be provided by transformer windings. It will further be obvious that details of the matters described herein may be modified without departing from the invention which should not be construed as limited except as required by the following claims.

What is claimed is:

1. A flowmeter comprising a conduit for flowing fluid, electromagnetic means providing a magnetic field transverse to said conduit, means supplying alternating current to said electromagnetic means, electrodes exposed to fluid flowing through said conduit and located on a line extending transversely through said field to pick up signals generated by flow of fluid through said field, an amplifier having its input receiving signals from said electrodes, means including leads connecting said electrodes to the input of said amplifier, a network receiving an input from said alternating current supplying means and providing an output to said amplifier bucking the signals from said electrodes, and means controlled by said amplifier effecting adjustment of said network to null the signals delivered from the amplifier, the last mentioned means comprising a pair of devices, one responsive primarily to signal components at the input of said amplifier in phase with the signals picked up by said electrodes, and the other responsive primarily to signal components at the input of said amplifier in quadrature with the signals picked up by said electrodes, for providing said nulling signals, the second of said devices varying attenuation of the nulling signals to compensate for attenuation, due to phase shift, of the signals delivered by said electrodes through said leads.

2. A flowmeter according to claim 1 including a transformer having its primary connected to carry the alternating current supplied to said electromagnetic means and having its secondary connected to said network to provide the input to the latter.

3. A flowmeter comprising a conduit for flowing fluid, electromagnetic means providing a magnetic field transverse to said conduit, means supplying alternating current to said electromagnetic means, electrodes exposed to fluid flowing through said conduit and located on a line extending transversely through said field to pick up signals generated by flow of fluid through said field, an amplifier having its input receiving signals from said electrodes, means including leads connecting said electrodes to the input of said amplifier, a network receiving an input from said alternating current supplying means and providing an output to said amplifier bucking the signals from said electrodes, and means controlled by said amplifier effecting adjustment of said network to null the signals delivered from the amplifier, the last-mentioned means comprising a pair of devices, one responsive primarily to signal components at the input of said amplifier in phase with the signals picked up by said electrodes, and the other responsive primarily to signal components at the input of said amplifier in quadrature with the signals picked up by said electrodes, for providing said nulling signals, the second of said devices varying attenuation of the nulling signals to compensate for attenuation, due to phase shift, of the signals delivered by said electrodes through said leads, the second of said devices comprising a phase-sensitive reversible motor and a resistance-capacitance phase shifting network operated by said motor.

4. A flowmeter according to claim 3 including a transformer having its primary connected to carry the alternating current supplied to said electromagnetic means and having its secondary connected to said network to provide the input to the latter.

References Cited in the file of this patent

UNITED STATES PATENTS

| | | |
|---|---|---|
| 2,696,737 | Mittelmann | Dec. 14, 1954 |
| 2,729,103 | Raynsford et al. | Jan. 3, 1956 |
| 2,757,538 | Soffel | Aug. 7, 1956 |
| 2,844,568 | Mertz | July 22, 1958 |